Jan. 17, 1939.    R. RUPERT ET AL    2,144,390
FRUIT JUICE EXTRACTOR
Original Filed June 8, 1936    2 Sheets-Sheet 1

INVENTORS
Richard Rupert
Joseph M. Majewski Jr.
BY
ATTORNEY

Jan. 17, 1939.  R. RUPERT ET AL  2,144,390
FRUIT JUICE EXTRACTOR
Original Filed June 8, 1936    2 Sheets-Sheet 2
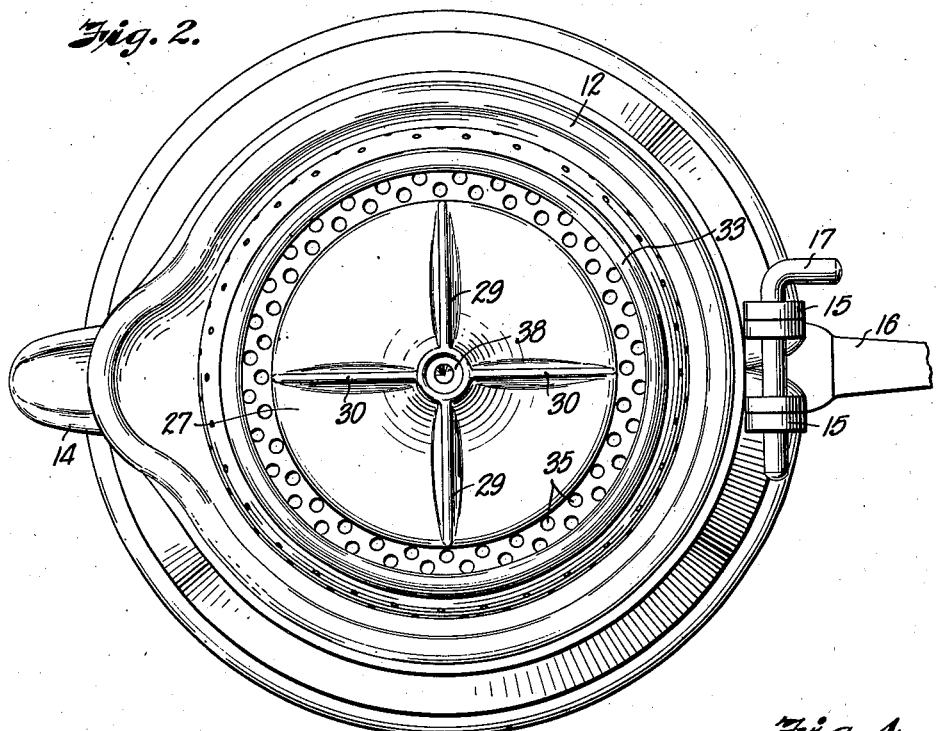
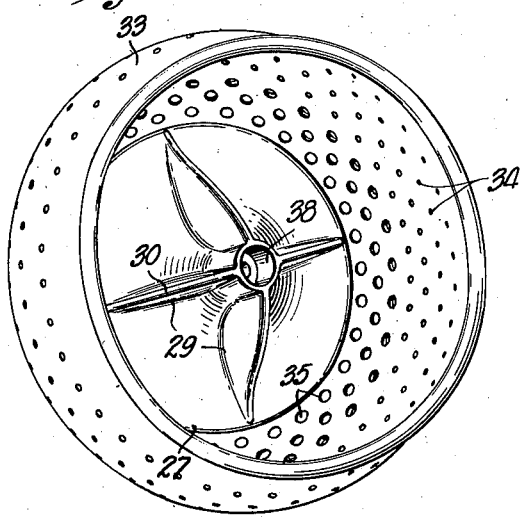
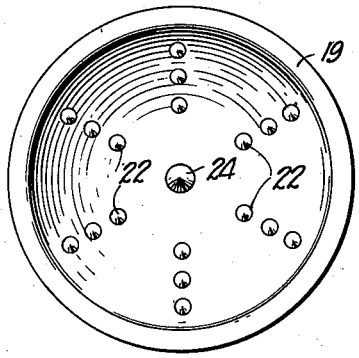
INVENTORS
Richard Rupert
Joseph M. Majewski Jr
BY
ATTORNEY Patented Jan. 17, 1939

2,144,390

UNITED STATES PATENT OFFICE 2,144,390

FRUIT JUICE EXTRACTOR

Richard Rupert and Joseph M. Majewski, Jr., Kansas City, Mo., assignors to Foster L. Taige, operating as Rival Manufacturing Company, Kansas City, Mo.

Original application June 8, 1936, Serial No. 84,077. Divided and this application July 8, 1937, Serial No. 152,574

1 Claim. (Cl. 146—3)

Our invention relates to fruit juice extractors and more particularly to a device for removing juice from oranges, lemons, grapefruit and the like.

This application is a divisional one of our copending application Serial No. 84,077, filed June 8, 1936.

Where there is a large demand for fruit juice, as for example, at soda fountains or clubs, juice is obtained from citrus fruits largely by means of motor driven fruit juice extractors. These consist almost exclusively of a reamer driven by an electric motor over which the cut side of half of a citrus fruit is pressed by an operator. In holding the fruit, the fingers of the operator's hand press against the rind unevenly, with the result that frequently pulp and fibre are torn from the rind. The rind, furthermore, is forced to assume various shapes, with the result that oil contained in the rind is usually liberated. This oil commingles with the juice extracted by the rotating reamer. It will be obvious that this oil which has come in contact with the operator's hand may be contaminated with soil or perspiration. Furthermore, the rind oil imparts a slightly bitter taste to the juice, which taste is not palatable to some people. After the juice has been reamed in this manner, it must be strained by a separate operation.

One object of our invention is to provide a fruit juice extractor of the motor driven type which will express the juice free of rind oil and will produce strained juice in a rapid, convenient and expeditious manner.

Another object of our invention is to provide a fruit juice extractor provided with strainer openings of such nature that they will not be readily clogged.

Other and further objects of our invention will appear from the following description.

In the accompanying drawings which form part of the instant specification and are to be read in conjunction therewith, and in which like reference numerals are used to indicate like parts in the various views:

Fig. 2 is a plan view of the fruit juice extractor shown in Fig. 1.

Fig. 3 is a perspective view of the reamer and strainer element of the form of our invention shown in Fig. 1.

Fig. 4 is a plan view of the fruit receiving cup forming part of the construction shown in Fig. 1.

Figure 1:
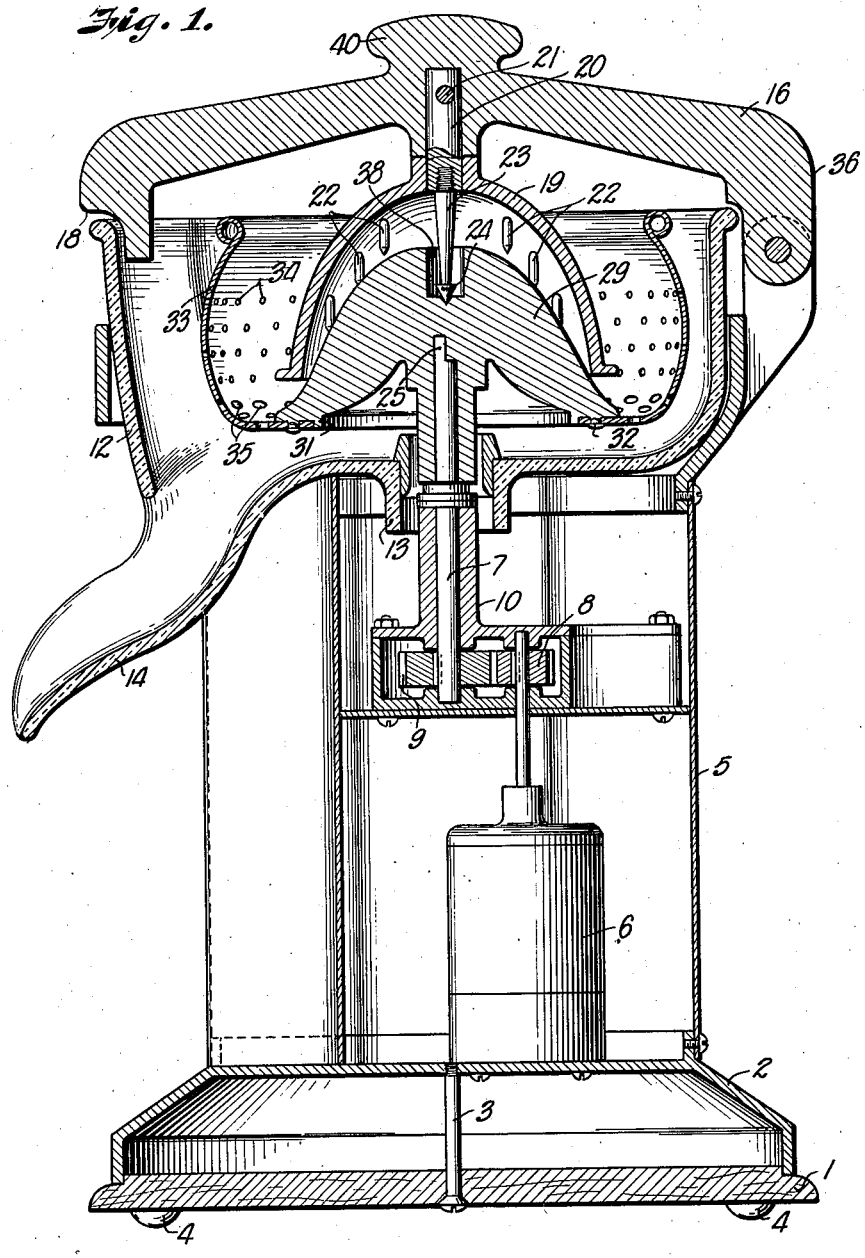
Fig. 1 is a sectional elevation of a fruit juice extractor showing one form of our invention.

In general, our invention contemplates the provision of a rotating reamer carrying a centrifugal strainer operating within a collecting vessel provided with an outlet adapted to conduct the juice into a receptacle. Pivoted adjacent the reamer is an arm carrying a stationary inverted cup-like member pivoted with impaling members adapted to hold the fruit from which the juice is being extracted, against rotation. The cup is also provided with a retaining member adapted to hold the fruit against the action of gravity so that it may be moved with the cup over the reamer and with the cup away from the reamer, upon movement of the arm which carries the cup.

More particularly, referring now to the drawings, upon a suitable base member 1 we secure a pedestal 2 by means of a retaining screw 3. Suitable rubber feet or cushion members 4 are secured to the base member 1. The pedestal 2 carries a housing 5 of any suitable construction for an electric motor 6, which is adapted to drive shaft 7 in any suitable manner, as for example, by means of a reduction transmission comprising pinion 8 and gear 9. The shaft 7 operates in a suitable bushing 10 and projects upwardly, as can readily be seen by reference to Fig. 1. Supported by housing 5 is a supporting ring 11 in which a juice receiving receptacle 12 is adapted to be seated. The receptacle 12 is fitted with a flanged opening 13, through which the shaft 7 is adapted to project, and a spout 14 for conducting juice to a collecting vessel of any suitable type. A bifurcated lug 15 is formed with or secured to supporting ring 11. An arm 16 is pivoted to lug 15 by means of pin 17. The arm 16 is provided with a shoulder 18, adapted to rest upon the lid of the juice receiving member 12, as can readily be seen by reference to Fig. 1. The arm 16 carries an inverted cap-like member 19, which is formed with a projection 20 adapted to seat in a suitable recess formed in the arm 16 and secured thereto by means of a pin 21. A plurality of short spikes 22 are formed with or secured to the inside surface of cup 19. These spikes are adapted to project into the rind of the fruit being subjected to a fruit juicing operation to hold the fruit against relative rotation with respect to the cup. A long fruit securing member 23 is adapted to be screwed into the cup-like member. The fruit securing member 23 is provided with a barb-like head 24. The function of member 23 is to pierce the rind of the fruit and hold it in the cup against the action of gravity so that, when the arm 16 is swung into position for the juice extracting operation, the fruit will not fall out of the cup. Similarly, after the fruit juice has been removed, the function of the long member 23 is to retain the rind within the cup enabling it to be swung clear of the reamer when the arm 16 is moved upwardly by means of handle 40. It will be noted that there is a fruit securing member which has a different function than the impaling members 22. The impaling members 22 cannot perform the function of member 23. In the first instance, no two pieces of citrus fruit are shaped alike and, until after the juicing operation is substantially complete, the rind will not conform with the interior contour of cap member 19. Furthermore, the simple impaling members will not serve to hold the rind, since their length must be limited due to the fact that their ends must clear the rotating reamer. If they are short enough to clear the reamer, they will not be long enough to hold the fruit against the action of gravity.

It will be noted that the end of shaft 7 terminates in a short end 25 which is shown of half circular cross section. The shape of this end may be of any suitable cross sectional design. A bushing 26 is formed interiorly, of complementary shape to the end 25 of shaft 7, so that the bushing 26 will be constrained to rotate with shaft 7 but may be easily lifted from the shaft. Secured to the bushing 26 is a reamer 27 which may be made out of any suitable material. The reamer is provided with a plurality of webs 29, the ends of which are filleted at 30 so as to wipe the juice containing cells against the rind rather than to tear the pulp from the fruit. The bushing 26 is formed with a flange 31, to which the reamer is attached by means of screws 32. Secured to the reamer 27 is a centrifugal strainer 33 which is provided with a plurality of openings 34, adapted to act as strainer openings. The centrifugal strainer 33 is also provided with openings 35 near the bottom thereof, which openings are of larger diameter than the openings 34. The strainer openings 34 are of such size that pulp and seeds will not be forced therethrough under the action of centrifugal force. The bottom openings 35 are of such size that pulp and seeds will not pass therethrough under the influence of gravity. In the juicing of an orange with our device, when the orange is first brought in contact with the reamer a large quantity of juice will be freed. It is important that this juice be permitted to run off rapidly, as too great a quantity of juice in the rotating reamer will cause it to spill over the top. The large size openings at the bottom will permit the juice to flow off rapidly. The pulp and seeds will be thrown outwardly by centrifugal force and will lodge in the portion of greatest diameter. This portion is provided with small size openings so that seeds and pulp will not be thrown therethrough by the action of centrifugal force.

In operation, the electric motor 6 is started by any suitable switch to drive the shaft 7 which will rotate the bushing 26 through the coupling means heretofore described. The bushing carries the reamer and centrifugal strainer so that these parts will rotate at the speed of shaft 7. The arm 16 is swung outwardly to the position shown in Fig. 2. It will be supported in this position by reason of the fact that surface 36 of the arm 16 will contact the surface 37 of the supporting ring 11. A citrus fruit to be subjected to a juice extracting operation is cut in half and the half fruit impaled by member 23. It will be observed that, due to the fact that the impaling member 23 is of considerable length, it will engage the rind of the half fruit, even though the shape of the fruit does not conform with the shape of cup 19. The barb-like head will prevent the rind from sliding off of the impaling member 23. The reamer 27 is provided with a central opening 38, adapted to receive the impaling member 23 when the arm is swung to the position shown in Fig. 1. The fruit being impaled and held against falling out of the cup through the action of gravity by means of the long impaling member and its associated head 24, the arm 16 is then swung and the cut side of the fruit brought into contact with the rotating reamer. The upper part of the reamer will first engage the fruit and ream the juice therefrom. Pressure is exerted by means of handle 40, and the reamer is thus forced farther into the fruit. The juice is rapidly extracted and is thrown out from the reamer by centrifugal force into the rotating strainer. In order to prevent a large accumulation of juice in the centrifugal strainer, with the resulting possibility that it will be thrown over the top of the strainer, the bottom of the strainer is fitted with larger openings 35 to insure a rapid passing off of juice. The juice will tend to ride upwardly in the strainer to the portion of largest diameter. Seeds and fibre will be retained by the strainer. A considerable portion of the pulp will likewise be retained. Fine juice cells and slivers of pulp small enough to pass through the holes 34 will find their way into the juice, passing into the juice receiving member 12 from which the juice flows through spout 14. The centrifugal force tends to throw the juice, with which the pulp and fibre are saturated, clear, thus insuring that the greater part of the juice of the orange will be extracted. In the juice extractors of the prior art, a considerable percentage of juice could not be recovered from the pulp and fibre, which act as a sponge to hold the same. The reaming operation tends to form a fringe of pulp near the plane of severance. The pulp is rich in vitamin C and it is desirable to insure that a portion of the pulp will find its way into the juice. It will be observed, by reference to Fig. 1, that the shape of the cup 19 is such that it is closely adjacent to the reamer blades 29 near the bottom thereof. This proximity will insure that the fringe of pulp is sheared from the rind in this vicinity. The pulp thus sheared is then thrown out into the rotating cylinder where cells of sufficient fineness will pass through the strainer openings 34, enabling a proportion of material rich in vitamin C to find its way into the juice. Any pulp cells or pieces of pulp sufficiently small to pass through the strainer openings 34 will be held substantially in suspension in the juice so that they are not objectionable therein.

After the juice has been extracted from the fruit, the arm 16 is swung upwardly, carrying the rind with it. The rind can be easily pulled from the cup. The centrifugal strainer containing the fibre, large pieces of pulp and seeds, can be lifted from the assembly and cleaned. The pulp and seeds can be removed from the strainer very easily while the device is rotating, by holding a spoon at the inside periphery of the strainer, wiping the seeds and fibre into the spoon.

It will be observed that we have accomplished the objects of our invention. We have provided a novel assembly for conveniently extracting juice from citrus fruits in a rapid and facile manner. A larger proportion of juice is obtained from fruit, due to the centrifugal strainer. The juice is delivered strained and clear of objectionable pulp, fibre and seeds.

It will be understood that certain features and sub-combinations are of utility and may be employed without reference to other features and sub-combinations. This is contemplated by and is within the scope of our claim. It is further obvious that various changes may be made in details within the scope of our claim without departing from the spirit of our invention. It is, therefore, to be understood that our invention is not to be limited to the specific details shown and described.

Having thus described our invention, what we claim is:

In a fruit juice extractor, a juice receiving member, a rotatable reamer positioned therein for removing pulp and juice from the fruit, a rotatable strainer surrounding said reamer and positioned to receive the pulp and juice from the reamer, said strainer being provided with a plurality of strainer openings along the sides and bottom thereof, said bottom openings being of larger size than the side openings, said side openings being of such size that the seeds will not be forced therethrough under the influence of centrifugal force and only the smaller portions of the pulp will pass therethrough during the rotation of the strainer, said bottom openings of such size that the pulp and seeds will not pass therethrough under the influence of gravity during the rotation of the strainer, and means for rotating the strainer and reamer.

RICHARD RUPERT.
JOSEPH M. MAJEWSKI, Jr.